(12) United States Patent
Zheng et al.

(10) Patent No.: US 11,500,277 B2
(45) Date of Patent: Nov. 15, 2022

(54) LIGHTING DEVICE FOR PROJECTING A STARRY PATTERN

(71) Applicant: Shenzhen Bolong Technology Co. Ltd., Shenzhen (CN)

(72) Inventors: Huazhu Zheng, Shenzhen (CN); Yunyun Lu, Shenzhen (CN); Caijian Zheng, Shenzhen (CN); Wenzhen Ouyang, Shenzhen (CN)

(*) Notice: Subject to any disclaimer, the term of this patent is extended or adjusted under 35 U.S.C. 154(b) by 0 days.

(21) Appl. No.: 17/411,172

(22) Filed: Aug. 25, 2021

(65) Prior Publication Data
US 2021/0381666 A1 Dec. 9, 2021

(30) Foreign Application Priority Data
Aug. 10, 2021 (CN) .......................... 202121865229.3

(51) Int. Cl.
| | | |
|---|---|---|
| G03B 21/20 | (2006.01) | |
| G03B 21/14 | (2006.01) | |
| G03B 21/32 | (2006.01) | |
| G03B 23/06 | (2006.01) | |
| G03B 21/00 | (2006.01) | |
| G03B 29/00 | (2021.01) | |

(52) U.S. Cl.
CPC ....... *G03B 21/2033* (2013.01); *G03B 21/001* (2013.01); *G03B 21/145* (2013.01); *G03B 21/208* (2013.01); *G03B 21/2053* (2013.01); *G03B 21/2066* (2013.01); *G03B 21/321* (2013.01); *G03B 23/06* (2013.01); *G03B 29/00* (2013.01); *G03B 21/2013* (2013.01)

(58) Field of Classification Search
CPC ........ F21S 10/063; F21V 14/04; F21V 17/10; F21V 23/0435; F21V 33/0056; F21V 5/04; F21V 7/04; G03B 21/145; G03B 21/2013; G03B 21/2033; G03B 21/2053; G03B 21/2066; G03B 21/208; G03B 21/321; G03B 23/06
See application file for complete search history.

(56) References Cited

U.S. PATENT DOCUMENTS 9,587,806 B2 * 3/2017 Liu ..................... F21V 23/0442
10,830,410 B1 * 11/2020 Wei ......................... F21V 11/16
(Continued)

FOREIGN PATENT DOCUMENTS

| CN | 110805861 A | * | 2/2020 | ................ F21S 9/02 |
| CN | 112161219 A | * | 1/2021 | ................ F21S 8/00 |

*Primary Examiner* — Magda Cruz

(57) ABSTRACT

The present disclosure discloses a projection lamp. The projection lamp includes a light-emitting assembly including at least one first non-coherent light source, a light-reflection medium, a first condensing lens, a driving device, a driving gear, and a driven gear. An inner wall surface of the light-reflection medium is formed by mutually connecting a plurality of irregular light reflection surfaces; the first non-coherent light source is arranged in the light-reflection medium; the first condensing lens is arranged above the light-reflection medium; the driving gear is connected to the driving device; and the driven gear is arranged on the light-reflection medium and is engaged with the driving gear to drive the light-reflection medium to rotate. The technical solution of the present disclosure effectively improves the diversity of the light effect of the projection lamp.

11 Claims, 24 Drawing Sheets

(56) References Cited

U.S. PATENT DOCUMENTS

| | | | |
|---|---|---|---|
| 11,118,745 B2 * | 9/2021 | Zheng | F21S 6/004 |
| 11,118,753 B1 * | 9/2021 | Zheng | F21V 3/049 |
| 11,221,117 B1 * | 1/2022 | Xu | F21S 10/063 |
| 2003/0103348 A1 | 6/2003 | Hung | |
| 2006/0133098 A1 * | 6/2006 | Lin | F21S 6/003 |
| | | | 362/414 |
| 2007/0012154 A1 * | 1/2007 | Tsai | B44C 5/005 |
| | | | 84/95.1 |
| 2010/0213880 A1 * | 8/2010 | Chien | G09F 9/33 |
| | | | 315/317 |
| 2011/0169392 A1 | 7/2011 | Chen et al. | |
| 2012/0106134 A1 * | 5/2012 | Chang | F21V 7/0091 |
| | | | 362/147 |
| 2013/0208479 A1 * | 8/2013 | Allan | F21S 10/007 |
| | | | 362/271 |
| 2015/0184844 A1 * | 7/2015 | Zhang | F21V 33/0028 |
| | | | 362/96 |
| 2016/0313636 A1 * | 10/2016 | Chien | F21S 9/022 |
| 2017/0038031 A1 * | 2/2017 | Chien | F21V 5/00 |
| 2017/0102130 A1 * | 4/2017 | Hu | F21S 10/063 |
| 2018/0013986 A1 * | 1/2018 | Chien | F21S 9/022 |
| 2021/0164628 A1 * | 6/2021 | Zheng | F21S 10/00 |
| 2021/0364142 A1 * | 11/2021 | Zheng | F21V 33/0056 |

\* cited by examiner

LIGHTING DEVICE FOR PROJECTING A STARRY PATTERN

TECHNICAL FIELD

The present disclosure relates to the field of projection devices, and in particular, a projection lamp.

BACKGROUND

Ambient lights are used in indoor places such as bedrooms, etc. Lamps are used to directly project light to create a starry sky and other environmental projection shapes, thereby creating corresponding atmospheres. An existing ambient projection lamp is basically a cloud-like or water ripple starry lamp correspondingly having a monotonous lighting effect, which easily causes visual fatigue.

SUMMARY

The present disclosure mainly aims to provide a projection lamp, and aims to solve the problem that a projection lamp has a monotonous light effect in the existing art.

In order to achieve the above purpose, the present disclosure provides a projection lamp, including:

a light emitting assembly including at least one first non-coherent light source, a light-reflection medium, a first condensing lens, a driving device, a driving gear and a driven gear.

An inner wall surface of the light-reflection medium is formed by mutually connecting a plurality of irregular light-reflection surfaces. The first non-coherent light source is arranged in the light-reflection medium; the first condensing lens is arranged above the light-reflection medium; the driving gear is connected to the driving device; the driven gear is arranged on the light reflection medium and is engaged with the driving gear to drive the light-reflection medium to rotate.

Optionally, the light-reflection medium is hemispherical or cubic or step-like.

Optionally, the light-reflection medium and the driven gear are integrated.

Optionally, an inner wall surface of the first condensing lens is formed by mutually connecting a plurality of polyhedral vertebral prisms.

Optionally, the light emitting assembly further includes a fixed frame; the fixed frame is provided with a mounting seat and a mounting slot; one end of the mounting seat passes through passes through the driven gear and extends into the light-reflection medium; the first non-coherent light source is arranged on the mounting seat; and the driving device is arranged in the mounting slot.

Optionally, the first non-coherent light source on the mounting seat horizontally irradiates the light-reflection medium; light is reflected to the first condensing lens through the light-reflection medium and is emitted after being refracted by the first condensing lens.

Optionally, the projection lamp further includes a laser assembly; the laser assembly includes at least one coherent light source and at least one diffraction medium; the diffraction medium is arranged above the coherent light source; and the coherent light source irradiates the diffraction medium.

Optionally, the projection lamp further includes a film assembly including at least one second non-coherent light source, a condensing piece, a film sheet, a dial assembly and a second condensing lens.

The second non-coherent light source is arranged in the condensing piece; the film sheet is fixed on the dial assembly; the dial assembly is arranged above the condensing piece, and is provided with a projection hole corresponding to a pattern of the film sheet in a light emitting direction of the condensing piece; and the second condensing lens is arranged above the projection hole.

Optionally, the dial assembly includes a dial and a pressing sheet; an accommodating slot is formed in the bottom of the dial; the pressing sheet is arrange in the accommodating slot; and the film sheet is arranged between the dial and the pressing sheet.

Optionally, the projection lamp further includes a control panel electrically connected to the driving device; and the control panel controls a rotating speed of the light reflection medium through the driving device.

Optionally, the projection lamp further includes a Bluetooth module and a Wi-Fi module which are electrically connected to the control panel.

Optionally, the projection lamp further includes an audio assembly electrically connected to the control panel; the audio assembly includes a horn and an audio control module; the audio control module is arranged on the control panel; and the horn is electrically connected to the audio control module.

The technical solution of the present disclosure is as follows. The first non-coherent light source is arranged in the light-reflection medium and emits light to the inner wall surface of the light-reflection medium; the inner wall surface of the light-reflection medium is formed by mutually connecting the plurality of irregular light-reflection surfaces, so that the light reflected by the light-reflection medium may show a light effect like water ripples. Meanwhile, the first light condensing lens is arranged above the light-reflection medium, and refracts and amplifies the light reflected by the light-reflection medium to increase an irradiation range of the light. Further, the driving device is in driving connection with the light-reflection medium to drive the light-reflection medium to rotate. Specifically, the driving device is provided with the driving gear, and the light-reflection medium is provided with the driven gear; the driving gear is engaged with the driven gear, so that the driving device can drive the light-reflection medium to rotate through the driving gear and the driven gear, and the light reflected by the light-reflection medium continuously moves and finally shows the light effect like dynamic water ripples. Therefore, the diversity of the light effect of the projection lamp is effectively improved.

BRIEF DESCRIPTION OF THE DRAWINGS

In order to describe the embodiments of the present disclosure or the technical solutions in the existing art more clearly, drawings required to be used in the embodiments or the illustration of the existing art will be briefly introduced below. Obviously, the drawings in the illustration below are merely some embodiments of the present disclosure. Those ordinarily skilled in the art also can obtain other drawings according to the structures shown in these drawings without doing creative work.

Figure 1:
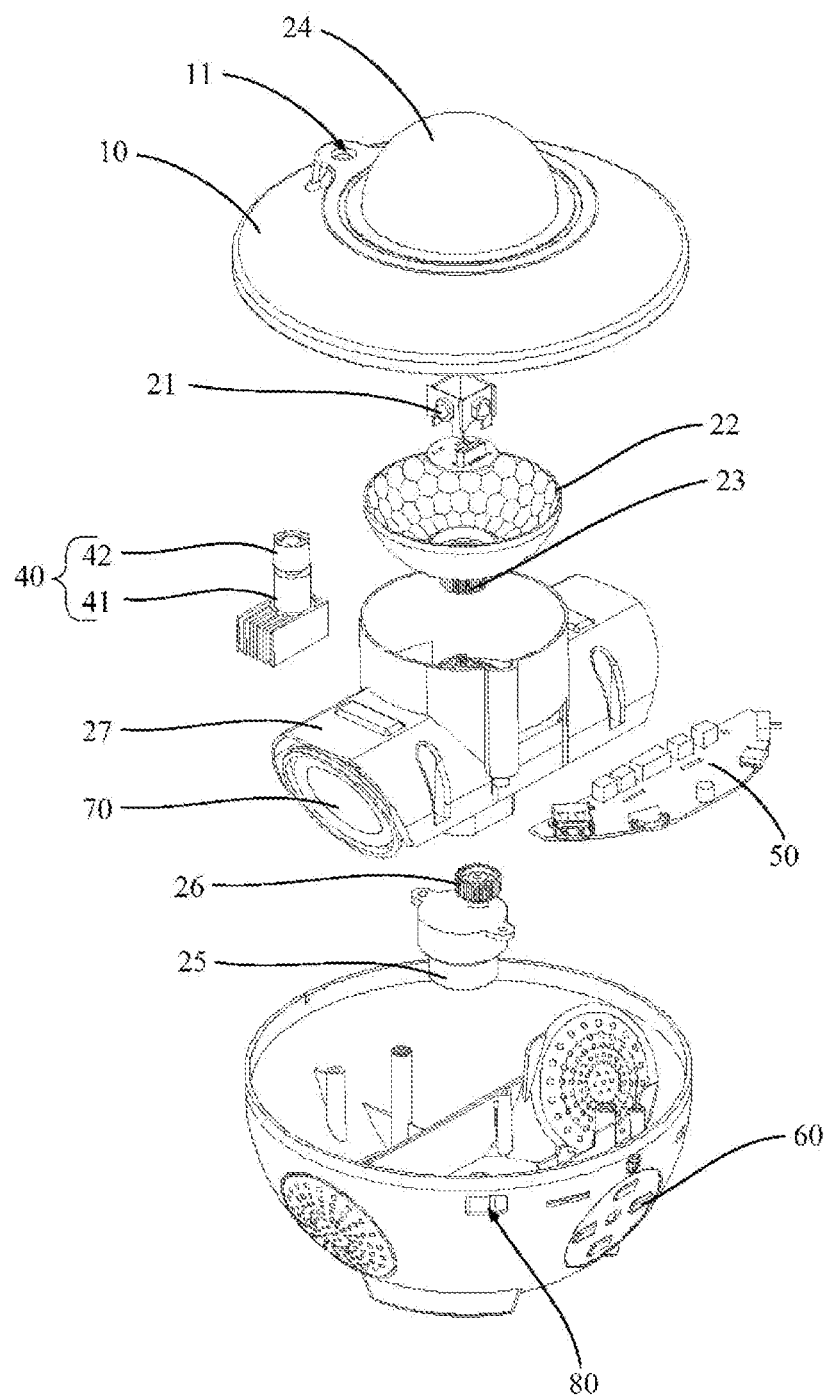
FIG. 1 is a schematic exploded structural diagram of one embodiment of a projection lamp of the present disclosure.
Figure 2:
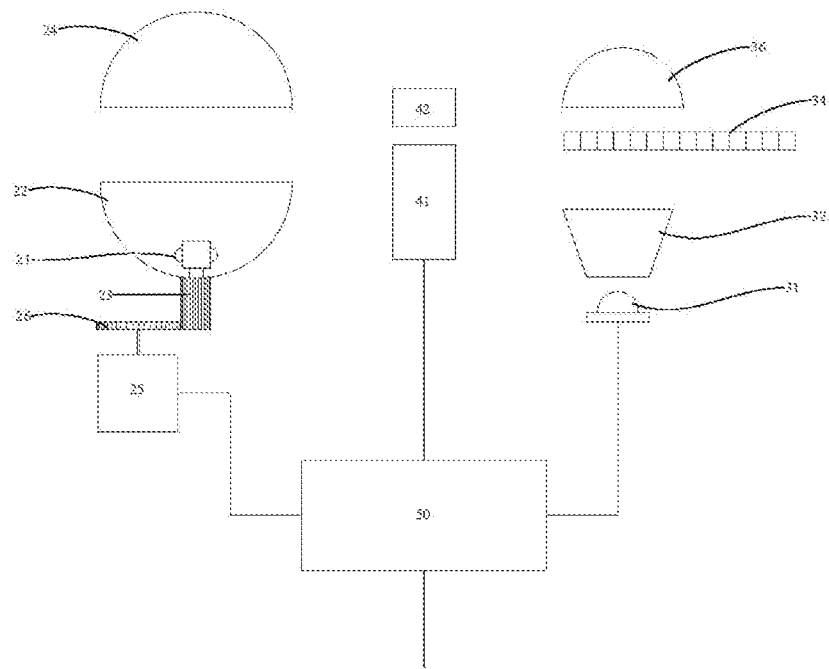
FIG. 2 is a schematic functional diagram of one embodiment of a projection lamp of the present disclosure.
Figure 3:
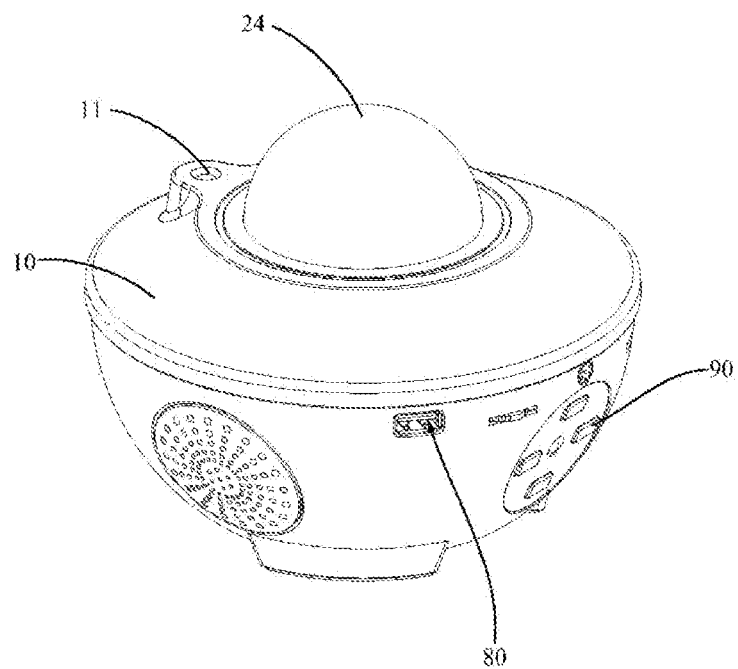
FIG. 3 is a schematic overall structural diagram of one embodiment of a projection lamp of the present disclosure.
Figure 4:
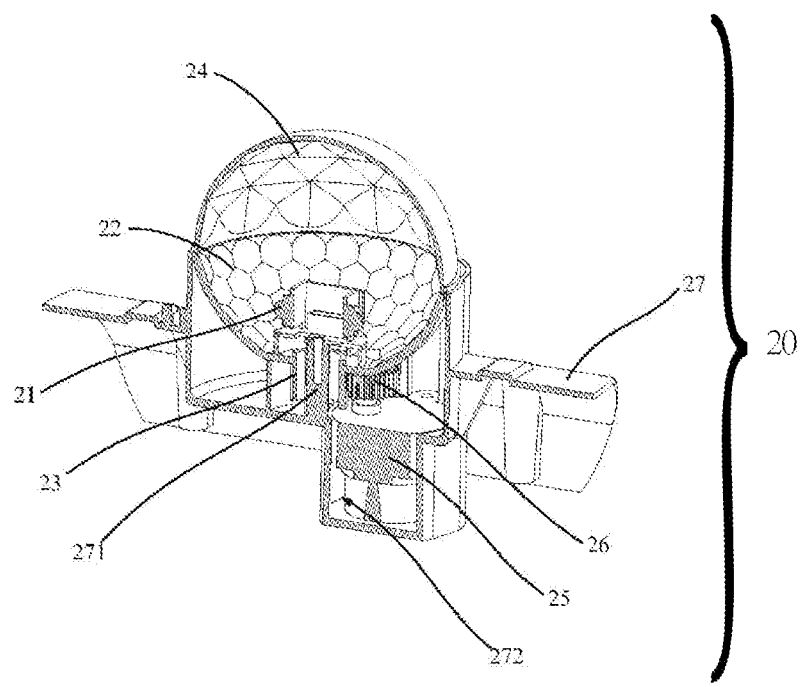
FIG. 4 is a schematic sectional diagram of a light-emitting assembly of the present disclosure.

Reference signs in the drawings:

| Serial number | Name | Serial number | Name |
|---|---|---|---|
| 10 | Shell | 20 | Light-emitting assembly |
| 11 | First light outlet hole | 21 | First non-coherent light source |
| 12 | Second light outlet hole | 22 | Light-reflection medium |
| 13 | Bracket | 23 | Driven gear |
| 30 | Film assembly | 24 | First condensing lens |
| 31 | Second non-coherent light source | 25 | Driving device |
| 32 | Condensing piece | 26 | Driving gear |
| 33 | Film sheet | 27 | Fixed frame |
| 34 | Dial assembly | 271 | Mounting seat |
| 341 | Dial | 272 | Mounting slot |
| 342 | Positioning shaft | 40 | Laser assembly |
| 343 | Accommodating slot | 41 | Coherent light source |
| 344 | Projection hole | 42 | Diffraction medium |
| 35 | Pressing sheet | 50 | Control panel |
| 36 | Second condensing lens | 60 | Key assembly |
| 37 | Carrier piece | 70 | Horn |
| 80 | USB interface | | |

The implementation, function characteristics and advantages of the present disclosure will be further described in combination with embodiments and with reference to accompanying drawings.

DESCRIPTION OF THE EMBODIMENTS

The technical solutions in the embodiments of the present utility model will be described clearly and completely below with reference to the drawings in the embodiments of the present utility model. Obviously, the embodiments described herein are only part of the embodiments of the present utility model, not all the embodiments. Based on the embodiments in the present disclosure, all other embodiments obtained by those of ordinary skill in the art without creative work shall fall within the protection scope of the present disclosure.

It should be noted that if there is a directional indication (such as up, down, left, right, front, back . . . ) in the embodiments of the present disclosure, the directional indication is only used to explain a relative positional relationship between components, motion situations, etc. at a certain specific attitude (as shown in the figures). If the specific attitude changes, the directional indication also correspondingly changes.

In addition, if there are descriptions related to "first", "second", etc. in the embodiments of the present disclosure, the descriptions of "first", "second", etc. are only used for descriptive purposes, and cannot be understood as indicating or implying its relative importance or implicitly indicating the number of technical features indicated. Therefore, features defined by "first" and "second" can explicitly instruct or impliedly include at least one feature. In addition, if "and/or" appears in the full text, it includes three parallel solutions, "A and/or B" is taken as an example, including solution A, solution B, or solutions that meet both A and B. In addition, the technical solutions between the various embodiments can be combined with each other, but it must be based on what can be achieved by those of ordinary skill in the art. When the combination of technical solutions is contradictory or cannot be achieved, it should be considered that such a combination of technical solutions does not exist, and is not within the scope of protection claimed by the present disclosure.

The present disclosure provides a projection lamp.

In the embodiments of the present disclosure, as shown in FIG. 1 to FIG. 24, the projection lamp includes:

a light emitting assembly 20 including at least one first non-coherent light source 21, a light-reflection medium 22, a first condensing lens 24, a driving device 25, a driving gear 26 and a driven gear 23.

An inner wall surface of the light-reflection medium 22 is formed by mutually connecting a plurality of irregular light-reflection surfaces. The first non-coherent light source 21 is arranged in the light-reflection medium 22; the first condensing lens 24 is arranged above the light-reflection medium 22; the driving gear 26 is connected to the driving device 25; the driven gear 23 is arranged on the light reflection medium 22 and is engaged with the driving gear 26 to drive the light-reflection medium 22 to rotate.

It should be explained that the light-emitting assembly 20 is a light-emitting device of the projection lamp, which is used to project light similar to a water ripple effect. The first non-coherent light source 21 is used to emit light, and can be an LED light source, a superluminesent diode and a broad-band light source, which is specifically not limited here. There may be a plurality of non-coherent light sources 21 to enhance the light-emitting intensity of the projection lamp. The light-reflection medium 22 is used to reflect the light emitted by the first non-coherent light source 21. An inner wall surface of the light-reflection medium is formed by mutually connecting a plurality of irregular light-reflection surfaces, and an inner wall surface of the light-reflection medium 22 is hemispherical, so that the reflected light will show a light effect similar to water ripples. It should be explained that the first non-coherent light source 21 is arranged in the light-reflection medium 22, and is disposed at a position in the light-reflection medium 22 close to the center, so that the light-reflection medium 22 uniformly reflects the light emitted by the first non-coherent light source 21. The first condensing lens 24 is arranged above the light-reflection medium 22 and used to refract and amplify the light reflected by the light-reflection medium 22 and emit the light, so that the irradiation range of the light can be effectively enlarged. Meanwhile, the driving device 25 is used to drive the light-reflection medium 22 to rotate, and may be a motor or a cylinder, which is specifically not limited here. The driving device 25 is provided with a driving gear 26. The light-reflection medium 22 is provided with a driven gear 23. The driving gear 26 is engaged with the driven gear 23, so that the driving device 25 can drive the light-reflection medium 22 by means of the driving gear 26 and the driven gear 23 to rotate, and finally, the light emitted by the light-emitting assembly 20 shows a light effect like dynamic water ripples.

The light-reflection medium 22 and the driven gear 23 may be detachably connected, or integrated, which are specifically not limited here.

In addition, the projection lamp further includes a shell 10. The shell 10 is a shell of the projection lamp and is used to provide installation positions for other components of the projection lamp and protect other components of the projection lamp. The light-emitting assembly 20 is arranged in the shell 10, and the first condensing lens 24 is partially located outside the shell 10 to enlarge an irradiation range of the projection lamp. Meanwhile, the inner wall surface of the first condensing lens 24 may be formed by mutually connecting a plurality of polyhedral vertebral prisms, so that a refraction range of the first condensing lens 24 can be further enlarged to enlarge the irradiation range of the light.

As shown in FIG. 3 and FIG. 6 to FIG. 10, the shell 10 includes an upper shell and a lower shell. The upper shell is flat, and the lower shell is hemispherical.

As shown in FIG. 11 to FIG. 15, the overall shape of the shell 10 may also be similar to a flying saucer.

Figure 16:
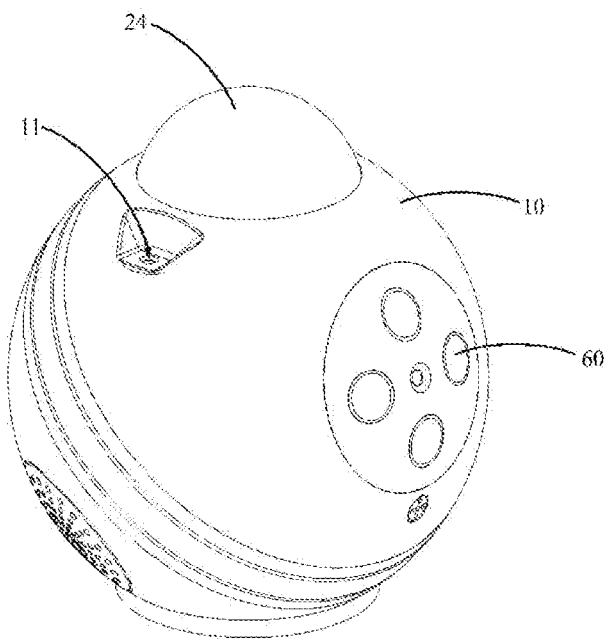
FIG. 16 is a schematic structural diagram of another embodiment of a projection lamp of the present disclosure.
Figure 17:
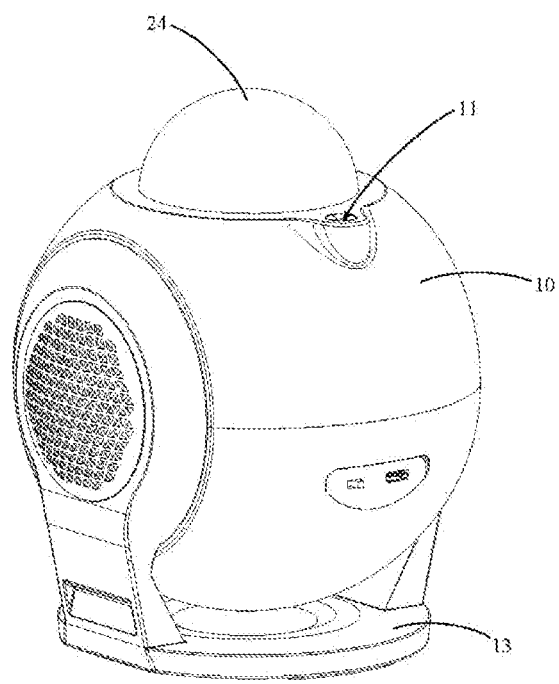
FIG. 17 is a schematic structural diagram of another embodiment of a projection lamp of the present disclosure.

As shown in FIG. 16 and FIG. 17, the overall shell 10 is spherical.

Figure 18:
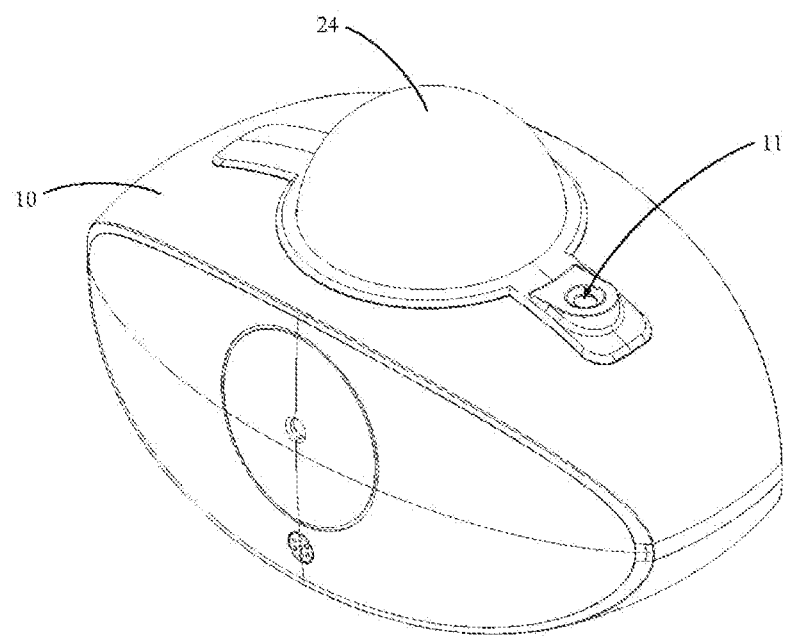
FIG. 18 is a schematic structural diagram of another embodiment of a projection lamp of the present disclosure.

As shown in FIG. 18, the shell 10 is combined with the first condensing lens 24, so that the overall shape of the projection lamp is moon-shaped.

Figure 19:
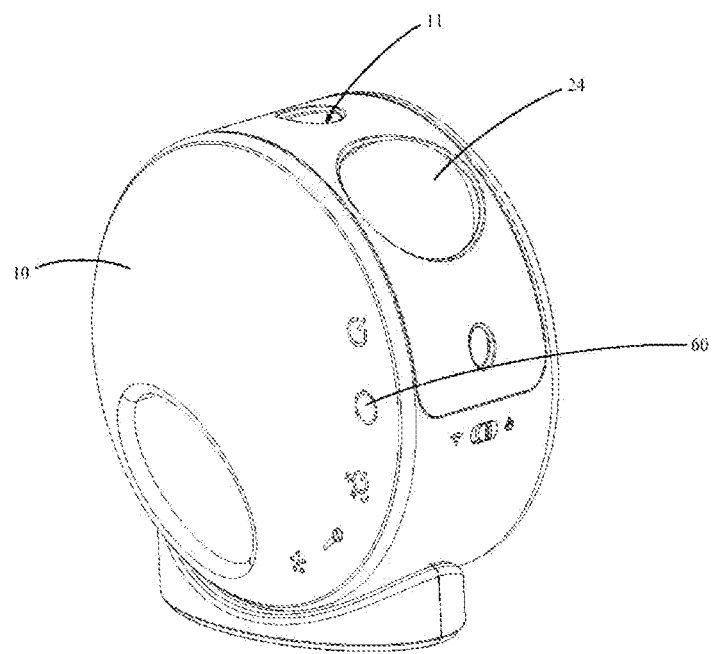
FIG. 19 is a schematic structural diagram of another embodiment of a projection lamp of the present disclosure.

As shown in FIG. 19, the overall shell 10 is cylindrical.

Figure 20:
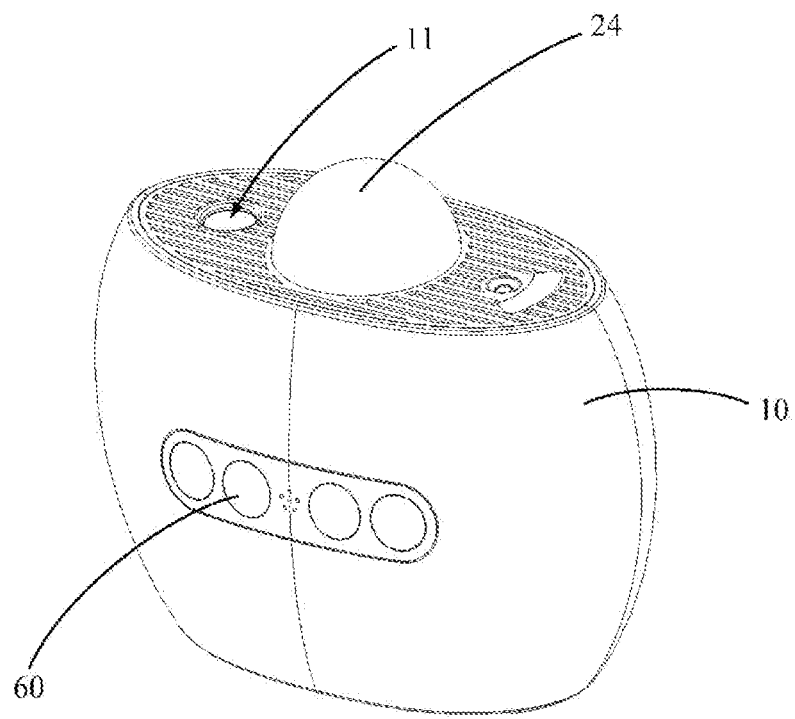
FIG. 20 is a schematic structural diagram of another embodiment of a projection lamp of the present disclosure.

As shown in FIG. 20, the shell 10 is combined with the first condensing lens 24, so that the overall shape of the projection lamp is kettle-shaped.

Figure 21:
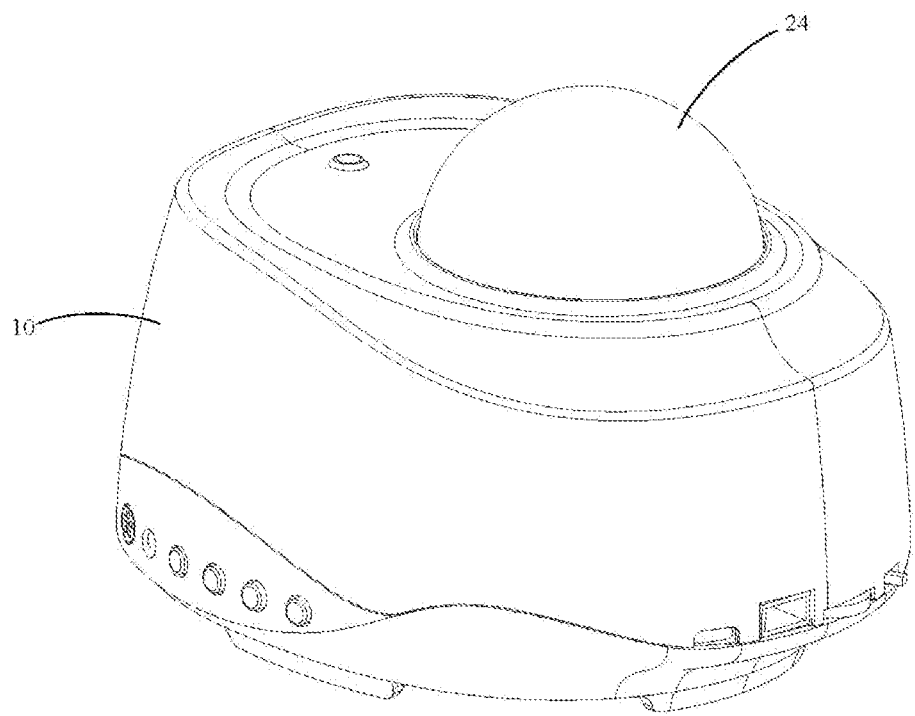
FIG. 21 is a schematic structural diagram of another embodiment of a projection lamp of the present disclosure.

As shown in FIG. 21, the overall shell 10 is box-type.

Figure 22:
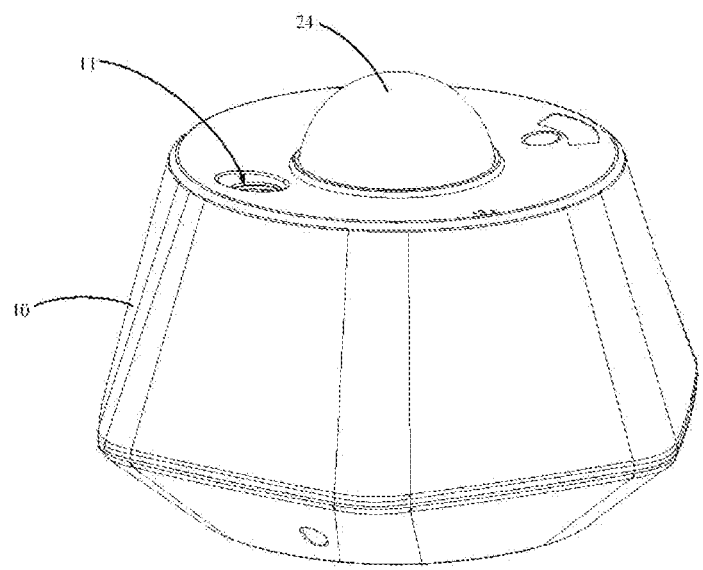
FIG. 22 is a schematic structural diagram of another embodiment of a projection lamp of the present disclosure.

As shown in FIG. 22, the overall shell 10 is space diamond-shaped.

Figure 23:
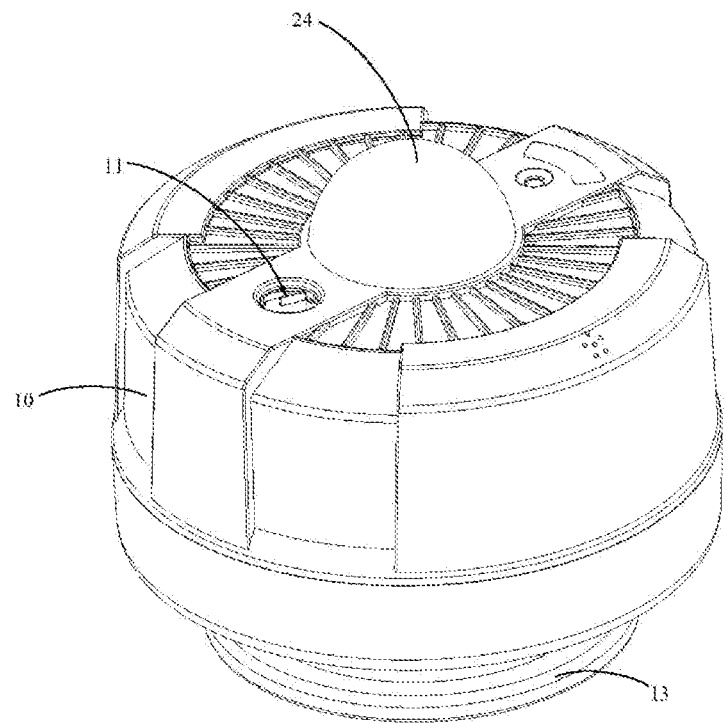
FIG. 23 is a schematic structural diagram of another embodiment of a projection lamp of the present disclosure.

As shown in FIG. 23, the overall shell 10 is engine-shaped.

Figure 24:
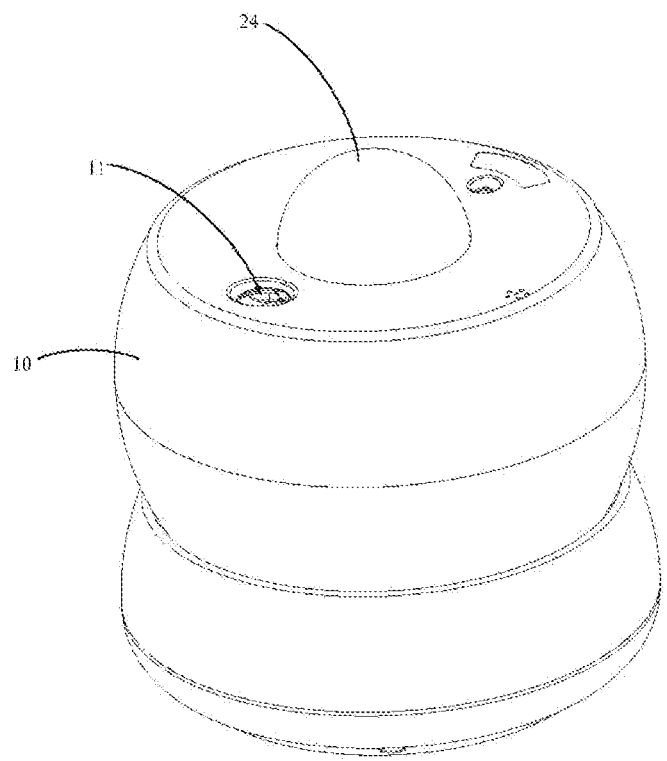
FIG. 24 is a schematic structural diagram of another embodiment of a projection lamp of the present disclosure.

As shown in FIG. 24, the overall shell 10 is gourd-shaped.

In order to adapt to the above-mentioned shell 10 with different shapes, the overall light-reflection medium 22 may be hemispherical, or cubic, or step-like, as long as it adapts to the shape of the shell 10, so that there is no limitation here.

Further, the projection lamp may also be provided with a bracket 13. The bracket 13 is rotatably connected with the shell 10 to support the shell 10, so that the shell 10 rotates relative to the bracket 13, so as to facilitate adjusting a projection direction of the projection lamp, which effectively improves the practicability of the projection lamp.

The technical solution of the present disclosure is as follows. The first non-coherent light source 21 is arranged in the light-reflection medium 22 and emits light to the inner wall surface of the light-reflection medium 22; the inner wall surface of the light-reflection medium 22 is formed by mutually connecting the plurality of irregular light-reflection surfaces, so that the light reflected by the light-reflection medium 22 may show a light effect like water ripples. Meanwhile, the first light condensing lens 24 is arranged above the light-reflection medium 22, and refracts and amplifies the light reflected by the light-reflection medium 22 to increase an irradiation range of the light. Further, the driving device 25 is in driving connection with the light-reflection medium 22 to drive the light-reflection medium 22 to rotate. Specifically, the driving device 25 is provided with the driving gear 26, and the light-reflection medium 22 is provided with the driven gear 23; the driving gear 26 is engaged with the driven gear 23, so that the driving device 25 can drive the light-reflection medium 22 to rotate through the driving gear 26 and the driven gear 23, and the light reflected by the light-reflection medium 22 continuously moves and finally shows the light effect like dynamic water ripples. Therefore, the diversity of the light effect of the projection lamp is effectively improved.

Further, the light emitting assembly 20 further includes a fixed frame 27; the fixed frame 27 is provided with a mounting seat 271 and a mounting slot 272; one end of the mounting seat 271 passes through the driven gear 23 and extends into the light-reflection medium 22; the first non-coherent light source 21 is arranged on the mounting seat 271; and the driving device 25 is arranged in the mounting slot 272. In the present embodiment, the fixed frame 27 is used to provide mounting positions for other components of the light-emitting assembly 20 to improve the structural stability of the light-emitting assembly 20. Specifically, the fixed frame 27 is provided with the mounting seat 271 and the mounting slot 272; one end of the mounting seat 271 is fixed on the fixed frame 27, and the other end passes through the driven gear 23 and extends into the light-reflection medium 22; the first non-coherent light source 21 is located in the light-reflection medium 22 and fixed on the mounting seat 271. It can be understood that the light-reflection medium 22 and the driven gear 23 are movably sleeved on the outer side of the mounting seat 271; and the first non-coherent light source 21 is fixed on the mounting seat 271. It needs to be explained that the first non-coherent light source 21 may be specifically fixed on a side wall of the mounting seat 271, or fixed at a top end of the mounting seat 271, which is not limited here. Meanwhile, the mounting slot 272 is close to the mounting seat 271 to fix the driving device 25, so that the light-reflection medium 22, the first non-coherent light source 21 and the motor are relatively fixed, thus effectively improving the stability of rotation of the light-reflection medium 22.

Further, the first non-coherent light source 21 on the mounting seat 271 horizontally irradiates the light-reflection medium 22; light is reflected to the first condensing lens 24 through the light-reflection medium 22 and is emitted after being refracted by the first condensing lens 24. In the present embodiment, the first non-coherent light source 21 is disposed on the mounting seat 271 in a horizontal direction in a manner of facing the inner wall surface of the light-reflection medium 22, so that the light emitted by the first non-coherent light source 21 is emitted to the inner wall surface of the light-reflection medium 22, thus effectively preventing the light from being directly emitted out of the light-reflection medium 22 to affect the projection effect of the light-emitting assembly 20.

Further, as shown in FIG. 1, the projection lamp further includes a laser assembly 40. The laser assembly 40 includes at least one coherent light source 41 and at least one diffraction medium 42; the diffraction medium 42 is arranged above the coherent light source 41; and the coherent light source 41 irradiates the diffraction medium 42. In the present embodiment, the laser assembly 40 is another light-emitting device of the projection lamp, which is arranged in the shell 10 and used to enable the projection lamp to show another light effect. The coherent light source 41 includes a single-color laser; the shell 10 is provided with a first light outlet hole 11; the diffraction medium 42 is arranged in the first light outlet hole 11 and used to diffract the light emitted from the coherent light source 41, thus forming a diffraction beam; the diffraction beam is emitted to other objects to form bright spots; and in combination with the above-mentioned light effect of dynamic water ripples, a light effect like a moving star field can be formed, so that the diversity of the light effect of the projection lamp is further improved, and the user experience is enhanced.

It should be explained that diffraction refers to a physical phenomenon that a wave travels away from an original straight line when it encounters an obstacle. It refers to here that a light wave may travel away from an original transmission path when it passes through the diffraction medium 42, thus forming a light effect similar to stars.

Figure 5:
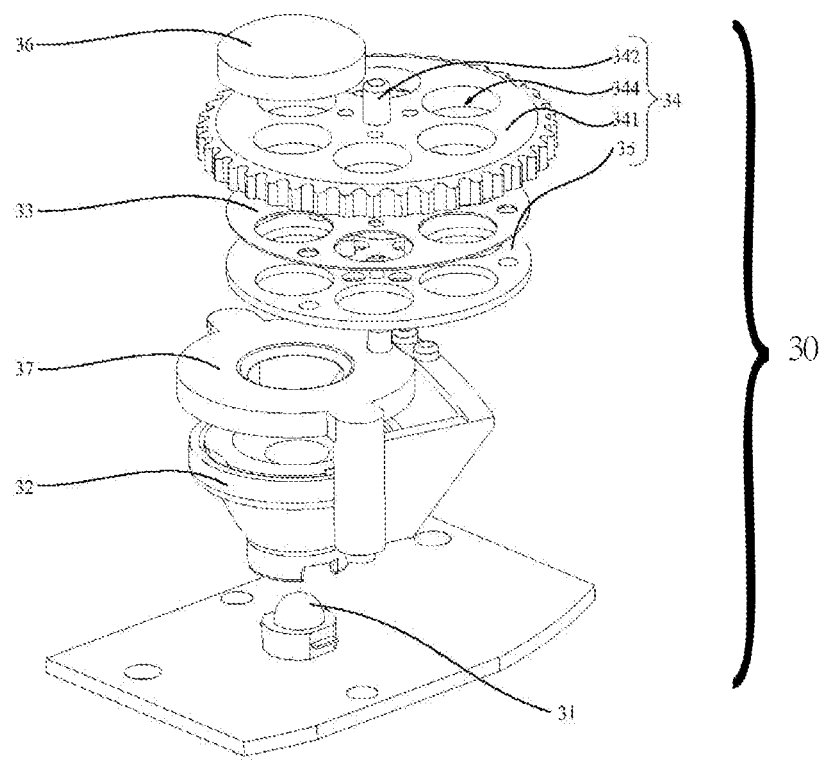
FIG. 5 is a schematic structural diagram of a film assembly of the present disclosure.
Figure 6:
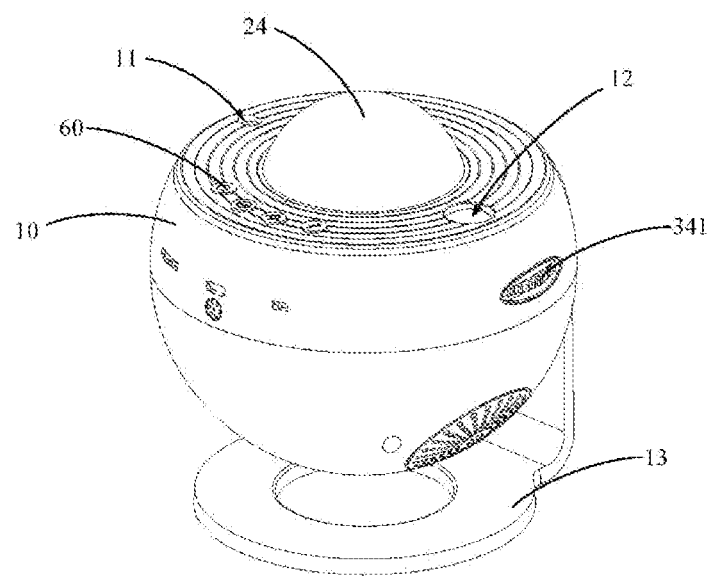
FIG. 6 is a schematic structural diagram of another embodiment of a projection lamp of the present disclosure.
Figure 7:
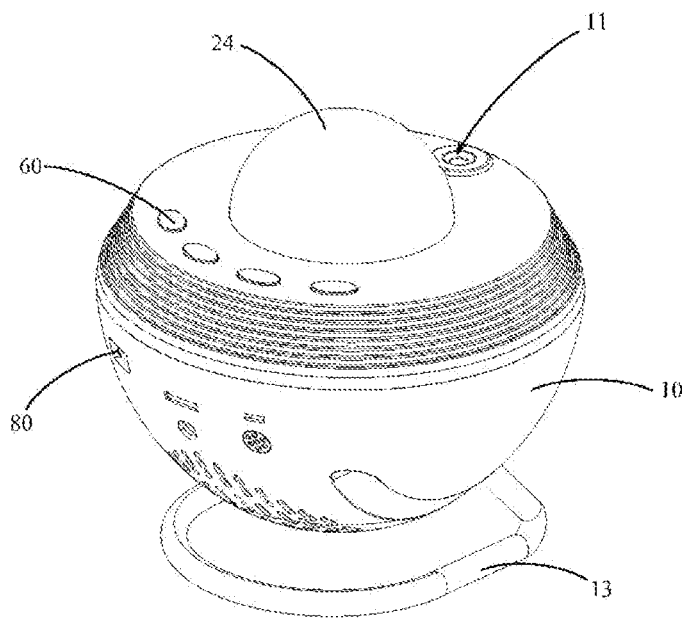
FIG. 7 is a schematic structural diagram of another embodiment of a projection lamp of the present disclosure.
Figure 8:
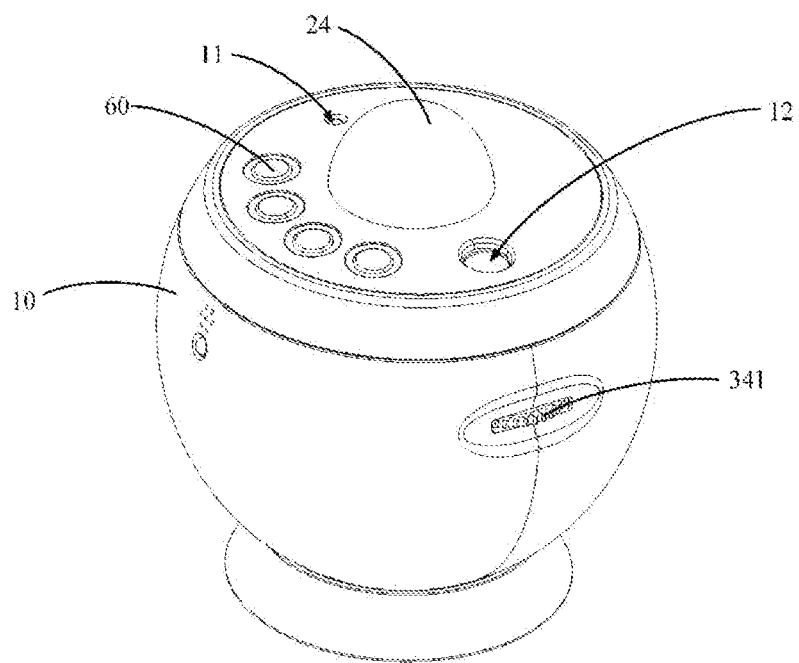
FIG. 8 is a schematic structural diagram of another embodiment of a projection lamp of the present disclosure.
Figure 9:
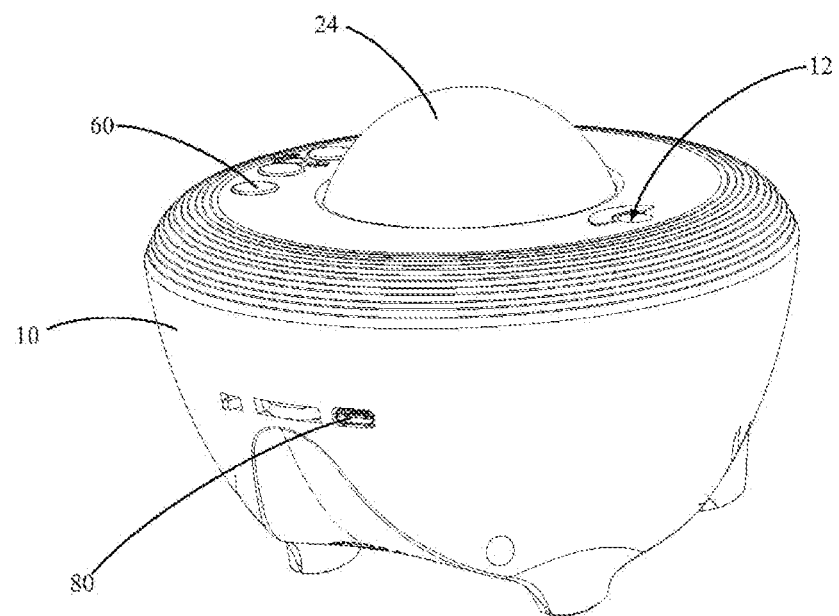
FIG. 9 is a schematic structural diagram of another embodiment of a projection lamp of the present disclosure.
Figure 10:
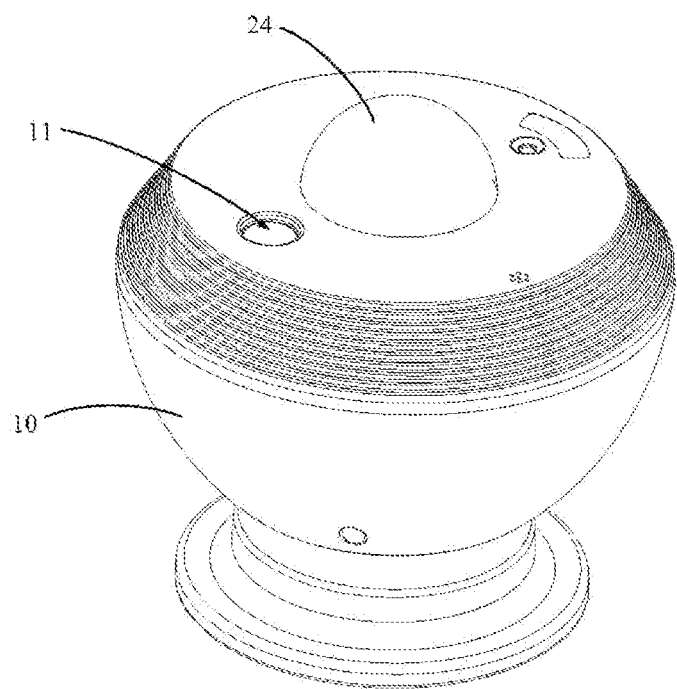
FIG. 10 is a schematic structural diagram of another embodiment of a projection lamp of the present disclosure.
Figure 11:
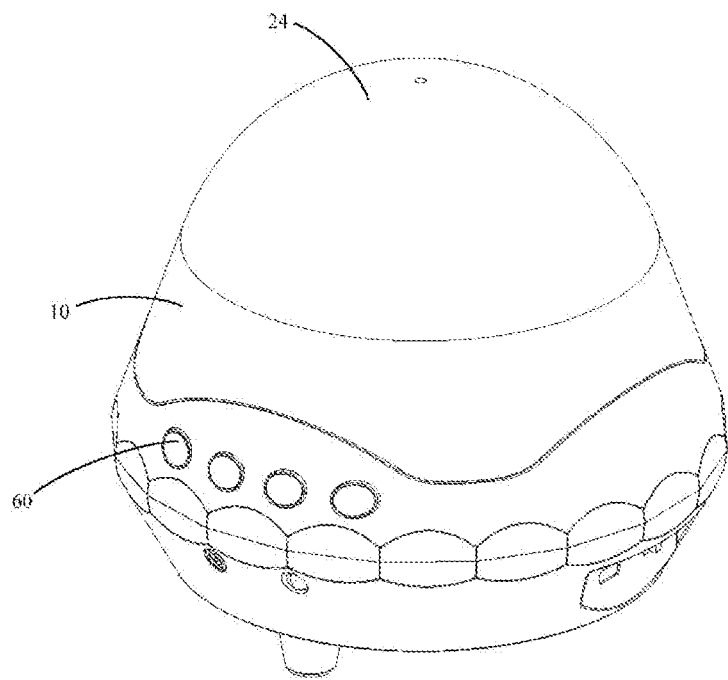
FIG. 11 is a schematic structural diagram of another embodiment of a projection lamp of the present disclosure.
Figure 12:
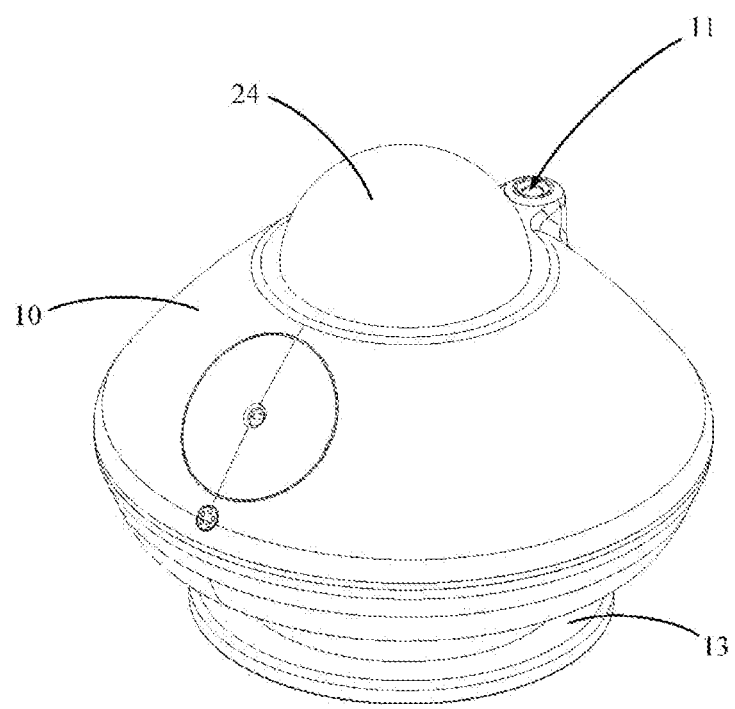
FIG. 12 is a schematic structural diagram of another embodiment of a projection lamp of the present disclosure.
Figure 13:
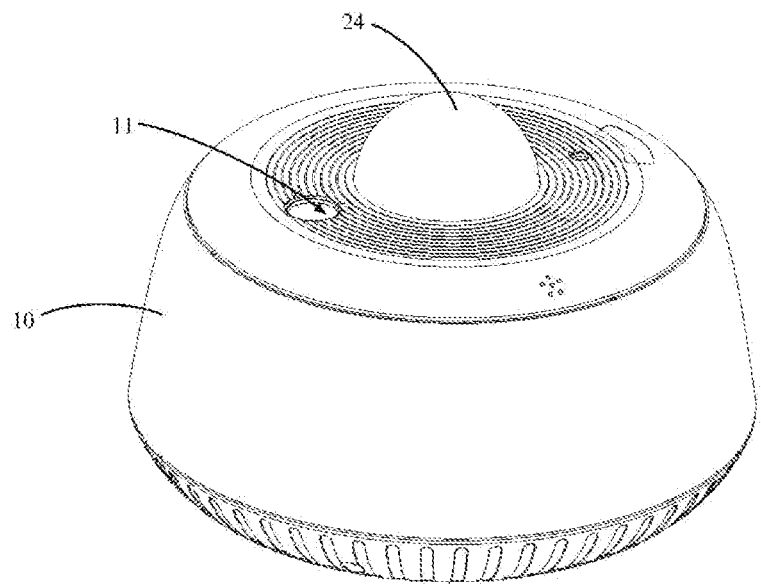
FIG. 13 is a schematic structural diagram of another embodiment of a projection lamp of the present disclosure.
Figure 14:
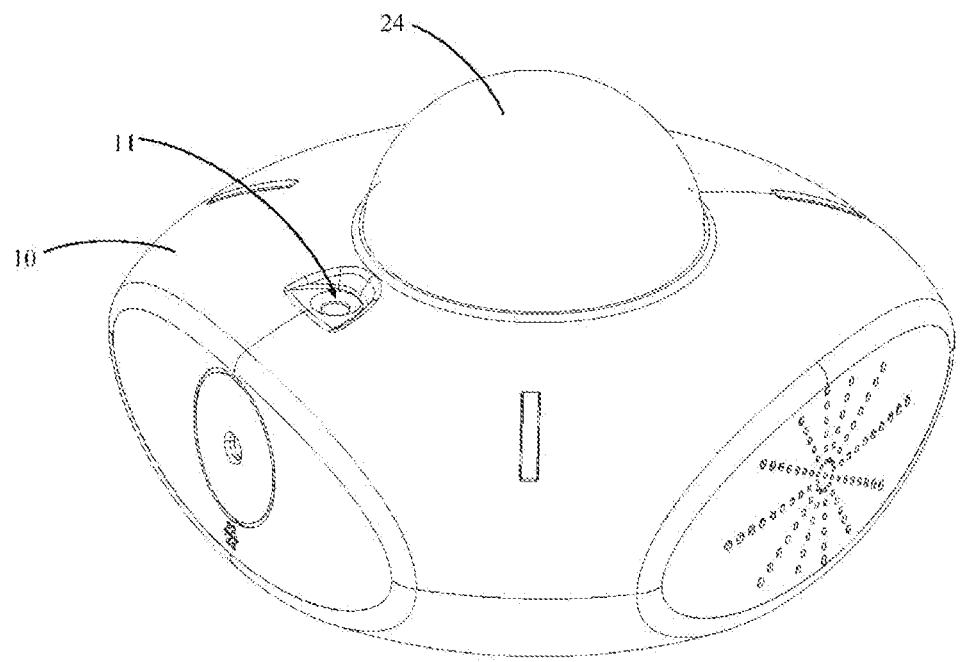
FIG. 14 is a schematic structural diagram of another embodiment of a projection lamp of the present disclosure.
Figure 15:
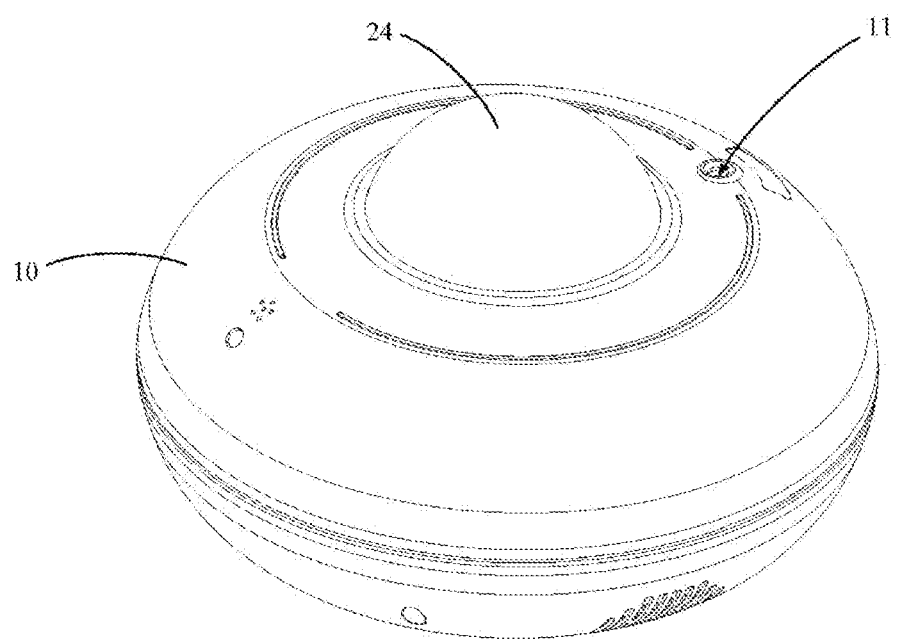
FIG. 15 is a schematic structural diagram of another embodiment of a projection lamp of the present disclosure.

Further, as shown in FIG. 5, the projection lamp further includes a film assembly 30. The film assembly 30 includes at least one second non-coherent light source 31, a condensing piece 32, a film sheet 33, a dial assembly 34, and a second condensing lens 36. The second non-coherent light source 31 is arranged in the condensing piece 32; the film sheet 33 is fixed on the dial assembly 34; the dial assembly 34 is arranged above the condensing piece 32; the dial assembly 34 is provided with a projection hole 344 corresponding to a pattern of the film sheet 33 in a light-emitting direction of the condensing piece 32; and the second condensing lens 36 is arranged above the projection hole 344.

In the present embodiment, the film assembly 30 is another light-emitting device of the projection lamp, which is arranged in the shell 10 and has another light-emitting mode different from the above-mentioned light-emitting assembly 20 and the laser assembly 40. The second non-coherent light source 31 has the same function as the first non-coherent light source 21, so that descriptions thereof are omitted here. The condensing piece 32 is sleeved on the second non-coherent light source 31 and used to reflect the light emitted by the second non-coherent light source 31 to form a condensing beam to enhance the light intensity. The dial assembly 34 is arranged in the light-emitting direction of the condensing piece 32, and the dial assembly 34 is provided with the projection hole 344 used for light transmission. The film sheet 33 is a film for printing and platemaking, and various patterns may be preset on the film. The film sheet 33 is fixed on the dial assembly 34. The patterns of the film sheet 33 are located in the projection hole 344, so that after the condensing beam passes through the projection hole 344, the pattern of the film sheet 33 may be projected into a pattern light scenario; meanwhile, a second light outlet hole 12 is formed in a position of the shell 10 corresponding to the projection hole 344; the second condensing lens 36 is arranged in the second light outlet hole 12 to further enlarge an irradiation range of the light of the film assembly 30.

It should be explained that a plurality of second non-coherent light sources 31 may be provided according to an irradiation range required by a user, which is specifically not limited here.

In addition, various patterns may be preset on the film sheet 33, so that the projection hole 344 may be provided in a position of the dial assembly 34 corresponding to each pattern, so that the patterns of the film sheet 33 above the condensing piece 32 may be switched by pushing the dial assembly 34, and different patterns of the film sheet 33 can be projected, such as moon, celestial body, constellation, stars. Therefore, the number of pattern light scenarios of the projection lamp is increased, and the user experience is enhanced.

The film assembly 30 may further include a carrier piece 37. The carrier piece 37 is arranged above the condensing piece 32 and is used to carry the dial assembly 34 to prevent instability of the dial assembly 34 when a dial 341 is pushed.

Further, the dial assembly 34 includes the dial 341 and a pressing sheet 35; a positioning shaft 342 is arranged in the center of the dial 341; the dial assembly 34 is pushed to rotate by taking the positioning shaft 342 as a center; the film sheet 33 is arranged between the dial 341 and the pressing sheet 35; meanwhile, an accommodating slot 343 is formed in the bottom of the dial 341 and used to place the film sheet 33 and the pressing sheet 35. It should be explained that the dial 341, the film sheet 33 and the pressing sheet 35 are relatively fixed through fixing columns, thus effectively preventing the film sheet 33 from moving in the pushing process to affect the projection effect. Therefore, the practicability of the projection lamp is effectively improved.

Further, as shown in FIG. 1, the projection lamp further includes a control panel 50. The control panel 50 is electrically connected to the driving device 25, so that the control panel 50 controls a rotating speed of the light-reflection medium 22 through the driving device 25.

Further, the projection lamp further includes a Bluetooth module and a Wi-Fi module; and the Bluetooth module and the Wi-Fi module are arranged on the control panel 50. The Bluetooth module and the Wi-Fi module can realize wireless communication between the control panel 50 and a terminal such as a mobile phone or an intelligent sound box; a function of playing music is realized by mobile phone control; an on or off state of light and switching of light effects can be controlled through a mobile phone application (APP) or the intelligent sound box; the working state of the projection lamp can be remotely controlled at a fixed time point; and a function of remotely and wirelessly adjusting the brightness of light is realized.

Further, the projection lamp further includes an audio assembly electrically connected to the control panel 50; the audio assembly includes a horn 70 and an audio control module; the audio control module is arranged on the control panel 50; and the horn 70 is electrically connected to the audio control module, so that the projection lamp can realize a music playing function by controlling the audio control module.

Further, the shell 10 is also connected with a USB interface 80 electrically connected to the control panel 50 and used for connecting the projection lamp to an external power supply or multimedia equipment. The projection lamp further includes a key assembly 60 arranged on the shell 10. The key assembly 60 is electrically connected to the control panel 50 and used to realize functions of adjusting the volume, turning on and off the light, switching a music mode, adjusting the light brightness, etc. The projection lamp may be directly controlled by means of the key assembly 60.

The above descriptions are only optional embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. A lighting device projecting starry pattern, comprising:
   a light emitting assembly comprising at least one first non-coherent light source, a light-reflection medium, a first condensing lens, a driving device, a driving gear and a driven gear, wherein
   an inner wall surface of the light-reflection medium is formed by mutually connecting a plurality of irregular light-reflection surfaces; the first non-coherent light source is arranged in the light-reflection medium; the first condensing lens is arranged above the light-reflection medium; the driving gear is connected to the driving device; and the driven gear is arranged on the light-reflection medium and is engaged with the driving gear to drive the light-reflection medium to rotate;
   wherein the lighting device projecting starry pattern further comprises a film assembly comprising at least one second non-coherent light source, a condensing piece, a film sheet, a dial assembly and a second condensing lens;
   wherein the second non-coherent light source is arranged in the condensing piece; the film sheet is fixed on the dial assembly; the dial assembly is arranged above the condensing piece, and is provided with a projection hole corresponding to a pattern of the film sheet in a light emitting direction of the condensing piece; and the second condensing lens is arranged above the projection hole.

2. The lighting device projecting starry pattern according to claim 1, wherein the light-reflection medium is hemispherical or cubic or step-like.

3. The lighting device projecting starry pattern according to claim 1, wherein the light-reflection medium and the driven gear are integrated.

4. The lighting device projecting starry pattern according to claim 1, wherein the inner wall surface of the first condensing lens is formed by mutually connecting a plurality of polyhedral vertebral prisms.

5. The lighting device projecting starry pattern according to claim 1, wherein the light emitting assembly further comprises a fixed frame; the fixed frame is provided with a mounting seat and a mounting slot; one end of the mounting seat passes through the driven gear and extends into the light-reflection medium; the first non-coherent light source is arranged on the mounting seat; and the driving device is arranged in the mounting slot.

6. The lighting device projecting starry pattern according to claim 5, wherein the first non-coherent light source on the mounting seat horizontally irradiates the light-reflection medium; light is reflected to the first condensing lens through the light-reflection medium and is emitted after being refracted by the first condensing lens.

7. The lighting device projecting starry pattern according to claim 1, wherein the lighting device projecting starry pattern further comprises a laser assembly; the laser assembly comprises at least one coherent light source and at least one diffraction medium; the diffraction medium is arranged above the coherent light source; and the coherent light source irradiates the diffraction medium.

8. The lighting device projecting starry pattern according to claim 1, wherein the dial assembly comprises a dial and a pressing sheet; an accommodating slot is formed in the bottom of the dial; the pressing sheet is arrange in the accommodating slot; and the film sheet is arranged between the dial and the pressing sheet.

9. The lighting device projecting starry pattern according to claim 1, wherein the lighting device projecting starry pattern further comprises a control panel electrically connected to the driving device; and the control panel controls a rotating speed of the light-reflection medium through the driving device.

10. The lighting device p previously presented projecting starry pattern according to claim 9, wherein the lighting device projecting starry pattern further comprises a Bluetooth module and a Wi-Fi module which are electrically connected to the control panel.

11. The lighting device projecting starry pattern according to claim 9, wherein the lighting device projecting starry pattern further comprises an audio assembly electrically connected to the control panel; the audio assembly comprises a horn and an audio control module; the audio control module is arranged on the control panel; and the horn is electrically connected to the audio control module.

* * * * *